United States Patent
Bradley et al.

(10) Patent No.: US 6,834,508 B2
(45) Date of Patent: Dec. 28, 2004

(54) HYDROGEN STORAGE AND SUPPLY SYSTEM

(75) Inventors: Keith Bradley, Oakland, CA (US); Jeff Wyatt, Berkeley, CA (US); Seung-Hoon Jhi, Albany, CA (US); Young-Kyun Kwon, Albany, CA (US); Jean Christophe Gabriel, Pinole, CA (US); George Gruner, Los Angeles, CA (US)

(73) Assignee: Nanomix, Inc., Emeryville, CA (US)

( * ) Notice: Subject to any disclaimer, the term of this patent is extended or adjusted under 35 U.S.C. 154(b) by 0 days.

(21) Appl. No.: 10/285,731

(22) Filed: Oct. 31, 2002

(65) Prior Publication Data

US 2004/0093874 A1 May 20, 2004

Related U.S. Application Data

(60) Provisional application No. 60/406,787, filed on Aug. 29, 2002.

(51) Int. Cl.⁷ .......................... F17C 11/00; F17C 13/02; B67D 5/00; B65B 1/30; B65B 1/04
(52) U.S. Cl. ........................ 62/46.1; 62/49.1; 705/413; 141/83; 141/110
(58) Field of Search ................. 62/46.1, 49.1, 62/50.2; 222/3; 141/82, 83, 110; 705/413

(56) References Cited

U.S. PATENT DOCUMENTS

| | | | | |
|---|---|---|---|---|
| 2,157,103 A | * | 5/1939 | Zenner | 62/50.1 |
| 2,257,897 A | * | 10/1941 | Zenner et al. | 62/50.1 |
| 4,253,428 A | | 3/1981 | Billings et al. | 123/1 A |
| 4,343,770 A | * | 8/1982 | Simons | 422/112 |
| 4,570,446 A | | 2/1986 | Matsubara et al. | 62/48 |
| 4,580,404 A | | 4/1986 | Pez et al. | 62/55.5 |
| 4,608,830 A | | 9/1986 | Peschka et al. | 62/7 |
| 4,717,406 A | * | 1/1988 | Giacobbe | 62/642 |
| 4,960,450 A | * | 10/1990 | Schwarz et al. | 62/642 |
| 5,653,951 A | * | 8/1997 | Rodriguez et al. | 423/439 |
| 5,687,776 A | * | 11/1997 | Forgash et al. | 141/11 |
| 5,916,246 A | * | 6/1999 | Viegas et al. | 62/50.1 |
| 6,044,647 A | * | 4/2000 | Drube et al. | 62/50.1 |
| 6,080,501 A | * | 6/2000 | Kelley et al. | 429/31 |
| 6,113,673 A | * | 9/2000 | Loutfy et al. | 95/116 |
| 6,159,538 A | | 12/2000 | Rodriguez et al. | 427/213.31 |
| 6,182,717 B1 | | 2/2001 | Yamashita | 141/82 |
| 6,195,999 B1 | | 3/2001 | Arnold et al. | 60/649 |
| 6,268,077 B1 | | 7/2001 | Kelley et al. | 429/33 |
| 6,290,753 B1 | * | 9/2001 | Maeland et al. | 95/116 |
| 6,302,943 B1 | | 10/2001 | Johnson et al. | 95/96 |
| 6,305,442 B1 | | 10/2001 | Ovshinsky et al. | 141/231 |

(List continued on next page.)

OTHER PUBLICATIONS

Hynek, Fuller and Bentley, "Hydrogen Storage by Carbon Sorption," *Int. J. Hydrogen Energy*, vol. 22, No. 6, (1997) pp. 601–610.

*Primary Examiner*—William C. Doerrler
(74) *Attorney, Agent, or Firm*—O'Melveny & Myers LLP

(57) ABSTRACT

This invention provides for an apparatus and a method for operation of a cryogenic hydrogen storage system that contains a porous medium configured to adsorb hydrogen. The hydrogen storage and supply system includes a hydrogen source apparatus and a cryosorptive storage apparatus. Methods and devices that allow for an energy efficient filling of the cryosorptive apparatus from the hydrogen source apparatus are described. The cryosorptive hydrogen storage apparatus is filled with cold, pressurized hydrogen. During the course of filling, heat is generated in the cryosorptive storage device by the process of hydrogen adsorption on to the host medium. Methods and devices are provided for the removal the generated heat and the warm hydrogen. Further provided are devices and methods for the capture and recycle of escaped hydrogen within the hydrogen source apparatus.

10 Claims, 8 Drawing Sheets

U.S. PATENT DOCUMENTS

| | | | |
|---|---|---|---|
| 6,354,088 B1 * | 3/2002 | Emmer et al. ................ | 62/50.1 |
| 6,425,251 B2 | 7/2002 | Stetson et al. ................ | 62/46.2 |
| 6,432,283 B1 | 8/2002 | Fairlie et al. ............. | 204/230.2 |
| 6,503,584 B1 * | 1/2003 | McAlister .................. | 428/34.1 |
| 2001/0025655 A1 * | 10/2001 | Yoshida et al. .......... | 137/487.5 |
| 2002/0006365 A1 | 1/2002 | Suzuki et al. ................ | 422/177 |
| 2002/0020299 A1 | 2/2002 | Iwamoto et al. ............... | 96/146 |
| 2002/0100518 A1 | 8/2002 | Kuriiwa et al. ................ | 141/4 |
| 2002/0117123 A1 | 8/2002 | Hussain et al. ................ | 123/3 |
| 2002/0127458 A1 | 9/2002 | Pratt et al. .................... | 429/34 |

\* cited by examiner

HYDROGEN STORAGE AND SUPPLY SYSTEM

DOMESTIC PRIORITY CLAIM

The priority of U.S. Provisional Application No. 60/406,787, filed Aug. 29, 2002, is claimed.

FIELD OF THE INVENTION

This invention relates generally to the storage of hydrogen in containers and, more specifically, to an apparatus and a method for operation a cryogenic hydrogen storage system that contains porous media that can adsorb or absorb hydrogen.

BACKGROUND OF THE INVENTION

There is considerable interest in replacing fossil fuels with hydrogen because of hydrogen's high energy density per unit weight, its readily availability through the electrolysis of water, and the absence of polluting byproducts from its use. A number of technological components present challenges in making this transition to a hydrogen economy, and in the development of appropriate systems and infrastructure that can integrate into those that already exist. Particularly in the automotive industry, one significant challenge involves the current paucity of fully satisfactory systems for hydrogen storage, ones that are safe, reliable, conformable, lightweight, and comprehensively economic. The technical issues underlying various approaches to hydrogen storage include the form within which hydrogen is stored, the nature of the medium holding the hydrogen, and the operation of the containers holding the medium.

Holding hydrogen either as a compressed gas or as a cryogenic liquid are the currently standard forms of hydrogen storage. Compressed hydrogen can be stored in high pressure tanks (up to 10,000 p.s.i.). A problem with this method is that hydrogen diffuses very effectively, particularly when under high pressure, and currently available high pressure tanks do not effectively prevent such diffusion over an extended period of time. The requirement that tank materials be lightweight, and the fact that tank failure or damage in the event of an accident would be catastrophic provides further reason for pause. Storage of hydrogen in liquid form at cryogenic temperatures is also an approach that shows some promise. However, liquid hydrogen storage is burdened with a high boil-off rate that limits the dormancy of cryogenic liquid tanks, the time period for which a tank is stable without venting of accrued pressure.

Metal hydrides, such as magnesium-based alloys, have been used as media to store hydrogen. Although this method does not require high pressure and is operable at room temperature, there are numerous drawbacks. Metal hydrides are heavy, generally heavier than the hydrogen gas by a factor of about 50. Metal hydrides also undesirably contaminate the hydrogen as it is released. Further, metal hydride storage is not energy-efficient in this context; the energy required to extract the hydrogen from the metal hydride is equivalent to nearly half the amount stored within it. Finally, the rate of heat transfer within metal hydrides is limited by the fact that they are solids, and are not able to benefit from the higher rate of heat transfer afforded by gas that exists in porous materials. Metal hydride storage has been disclosed by Liu et al. (U.S. Pat. No. 4,358,316), by Bernauer et al. (U.S. Pat. No. 4,446,101), and by Ovshinsky et al. (U.S. Pat. No. 6,328,821).

Cryogenic surface adsorption of hydrogen on porous host media represents an alternative technological approach. Activated carbon, which has high surface area, has been used to store hydrogen at cryogenic temperatures and moderate pressures (50–70 bar), as has been described by Schwarz (U.S. Pat. No. 4,716,736). Cryogenic storage in activated carbon can be done at a 80K, a temperature higher than that required for liquid hydrogen storage. This relatively high operating temperature is helpful, and carbon is available in large supply; nevertheless an activated carbon solution to hydrogen storage is not free of technical problems. Commonly available activated carbon, for example, is not very pure, and contaminants are released with the hydrogen, and it is difficult to obtain release of all hydrogen stored on activated carbon. Other problems associated with activated carbon include low weight percent storage capacity and the need to maintain cryogenic temperatures. The pros and cons of the use of carbon are discussed by Hynek et al. in "Hydrogen storage by carbon sorption," lnt. J. Hydrogen Energy, 22, No. 6; 601–610, 1997.

Alternative forms of carbon for hydrogen storage that have been explored include carbon nanotubes and graphite fibers, which according to Rodriguez et al. (U.S. Pat. Nos. 5,653,951 and 6,159,538) bind hydrogen by chemisorption. Another approach using nano-structured media constructed from light elements, as described in pending patent applications of Bradley et al. (U.S. application Ser. No. 60/020,392) and Kwon et al. (U.S. application Ser. No. 60/020,344) is one in which hydrogen is adsorbed by physisorption. Other carbon-based approaches include the utilization of turbostratic microstructures, as described by Maeland (U.S. Pat. No. 6,290,753) and aerogel preparations of carbon fullerenes have been described by Lamb (U.S. Pat. No. 5,698,140). While structured forms of carbon do offer potential advantages over non-structured activated carbon, the basic thermodynamic properties of carbon which determine the operating temperatures at which hydrogen is desorbed from the medium remain substantially the same.

In the hydrogen economy, hydrogen will be stored in different places, in different unit volumes, and in operationally varying configurations, as it moves down the supply chain from producers to consumers. Producers will need to store large inventory volumes. Hydrogen will be stored in transporting vessels as it travels from producers to distributors. Fuel distributors, including stations that deliver fuel for vehicles, other power-driven devices, and electronic devices, will have large quantities on hand. Small point-of-use storage containers will also be required in micro-power plants, vehicles, and personal electronics. All these hydrogen storage applications have in common the need to maximize the amount of gas stored per unit tank volume, and differ fundamentally from the gasoline distribution system in which the fuel retains the same and incompressible form throughout the supply chain.

The requirements for hydrogen storage in the hydrogen economy have not yet been fully met, and there is a need for storage media that permit systems to operate at higher temperatures and lower pressures than those presently adapted for high pressure hydrogen storage. Further, there is a need for the development of surrounding systems that can accommodate and enable the integration of the storage media into all aspects of the hydrogen-fuel distribution system, from the manufacturing source to the engines and devices in which the hydrogen fuel is converted into useful power.

SUMMARY OF THE INVENTION

In accordance with an embodiment of the present invention a cryosorptive hydrogen storage system that includes a hydrogen source apparatus and a cryosorptive hydrogen storage apparatus is provided. The medium that stores the hydrogen is porous and has high surface area. In some embodiments, the hydrogen source apparatus and the cryosorptive storage apparatus are on separate platforms, and on others they are on a common platform. Methods for filling the cryosorptive hydrogen storage apparatus from the hydrogen source apparatus and for circulating hydrogen throughout the system are provided.

In accordance with other embodiments of the present invention, an apparatus and method for purifying hydrogen that enters the cryosorptive hydrogen storage apparatus are provided. In accordance with yet other embodiments of the present invention, a catalyst to adjust the ortho-para ratio of hydrogen entering the cryosorptive hydrogen storage apparatus is provided.

In accordance with still other embodiments of the present invention, features that allow warm hydrogen to escape the cryosorptive hydrogen storage apparatus are provided. In still other embodiments, vented warm hydrogen is captured by the inventive system and recycled into the hydrogen source apparatus, and made available again for conveyance to the cryosorptive hydrogen storage apparatus. In other embodiments, the warm hydrogen is captured and removed from the system.

A method by which to determine the net amount of hydrogen conveyed from the hydrogen source apparatus to the cryosorptive hydrogen storage apparatus during a filling operation is also provided.

Further features and advantages of the present invention will become apparent to those of ordinary skill in the art in view of the detailed description of preferred embodiments below, when considered together with the attached drawings and claims.

BRIEF DESCRIPTION OF THE DRAWINGS

The foregoing aspects of this invention and others will be readily appreciated by the skilled artisan from the following brief description of illustrative embodiments when read in conjunction with the accompanying drawings.

DETAILED DESCRIPTION OF THE INVENTION

The Cryosorptive Storage System: Features and General Operating Considerations

By adsorbing hydrogen on a high surface area medium at cryogenic temperatures, hydrogen can be stored densely at low pressures. Two areas of technology development will contribute to this area of commercial development and application. First, hydrogen storage media should be improved in terms of binding energy, storage capacity, and overall density. The first commercially practical porous hydrogen storage medium is likely to be either modified carbon, or boron nitrides, or new high-binding-energy media. Applicant has recently submitted a U.S. Patent Application (Jhi et al., Boron Oxide and Related Compounds for Hydrogen Storage), which provides an example of such a hydrogen storage medium. A second important area of technology development involves the engineering of effective containers and surrounding operating systems to accommodate and enable this form of hydrogen storage. In general, container technology will need to be responsive to the specifications and features of the storage media that emerge as being appropriate for their task. Accordingly, the basic architectural features of a hydrogen storage system centered on a low pressure cryosorptive medium-contained within a vessel have been recently described in the pending U.S. Patent Application of Bradley et al. (application Ser. No. 10/167,946, Hydrogen Storage and Supply System).

Figure 1A:
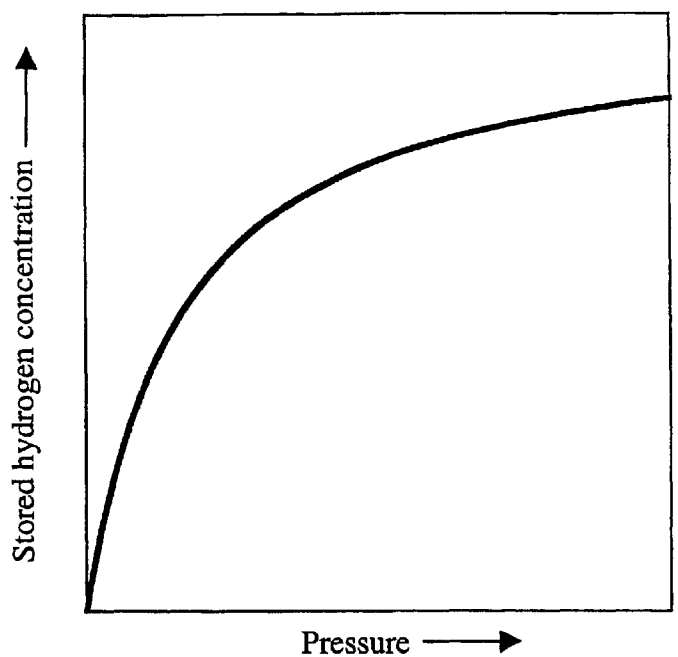
FIG. 1A. is a schematic representation of a pressure-composition isotherm. The amount of hydrogen adsorbed by a storage medium increases with increasing pressure.
Figure 1B:
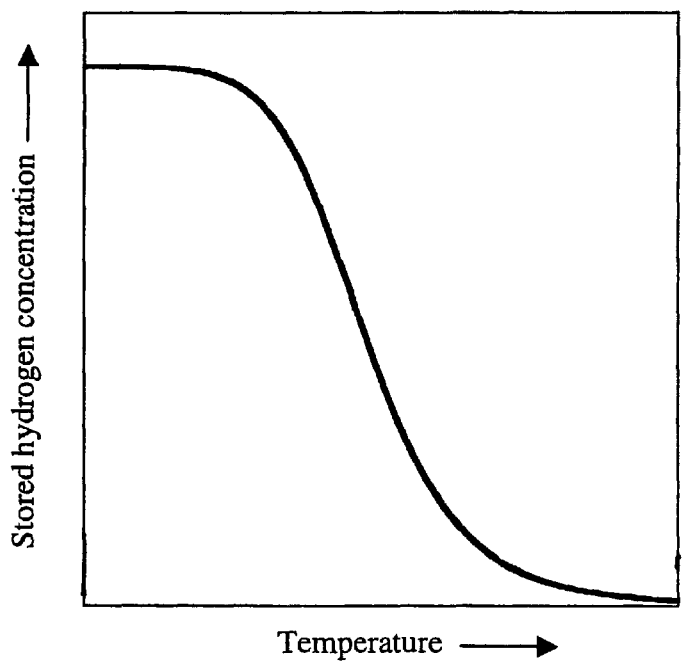
FIG. 1B. is a schematic representation of a temperature-composition isotherm. The amount of hydrogen adsorbed by a storage medium decreases with increasing temperature.

Mechanical and operating features of a surface adsorbing hydrogen storage system follow from roles of heat and pressure that govern surface adsorption of hydrogen, as illustrated in FIGS. 1A and 1B. At constant temperature, the quantity of gas adsorbed on the medium depends on the pressure of the gas in the system, as illustrated in FIG. 1A, where the curve represents the amount of hydrogen stored as a function of pressure within a cryosorptive vessel. Initially the cryosorptive system is at low pressure, and it becomes charged, or hydrogen-loaded, by applying cold hydrogen under pressure. This creates a nonequilibrium situation with regard to the distribution of hydrogen that is resolved as hydrogen adsorbs to the medium. As hydrogen adsorbs to the medium, heat is released, according to the heat of adsorption that is particular to the gas being adsorbed (in this case hydrogen) and the properties of the host medium.

The role of the heat of adsorption, generally reported in units of kJ/mol of gas adsorbed, in determining the operational specifics of a gas adsorbing process has been discussed in detail in the U.S. Patent Application of Jhi et al. (application Ser. No. 60/404,588; Boron Oxide and Related Compounds for Hydrogen Storage). Removal of this heat from the cryosorptive vessel is needed to maintain the vessel under cryogenic conditions. Another source of heat is simply that contained within the unfilled vessel itself, which is generally at a higher temperature than that of the cold hydrogen entering the space. Removal of heat from the cryosorptive hydrogen storage apparatus, as provided by embodiments of this invention, is generally accomplished by removal of warm hydrogen from the system, as is described in detail later in this disclosure.

When the cryosorptive hydrogen storage system is fully charged, the applied pressure is removed, the container closed, and the pressure in the container remains high. Release of hydrogen then occurs by pressure swing desorption. When the container is opened, hydrogen gas is discharged, the pressure inside the vessel drops, and hydrogen is desorbed from the storage medium. The system moves progressively down the curve depicted in FIG. 1A towards lower pressure and lower hydrogen content; at zero pressure, the hydrogen would be fully discharged.

In practice, however, the pressure of the partially depleted tank preferably does not even reach 1 bar, and temperature-swing desorption plays a role in hydrogen discharge as well. Fuel cells typically require two to three bar of pressure at their inlets, and thus the pressure inside the storage container should not drop below this level. Even at low pressures, however, a substantial amount of hydrogen remains in the medium. Temperature swing desorption, a process whereby medium-adsorbed hydrogen is driven off the medium as temperature increases, is required to extract this remaining hydrogen. At a constant pressure, the quantity of gas adsorbed on a medium depends on the temperature, as illustrated in FIG. 1B, where the curve represents the amount of hydrogen stored as a function of the temperature within a cryosorptive vessel. When the system has been discharged to a pressure of several bar, it is initially at a low temperature. To extract more hydrogen, the medium is heated, and the system moves rightward along the curve to higher temperature and lower hydrogen content. Just as a quantity of heat is released as hydrogen adsorbs onto the storage medium; so is a required quantity of heat consumed as hydrogen desorbs from the medium, thereby lowering the temperature in the cryosorptive vessel. This energy, the heat of adsorption, is analogous to the latent heat involved when a liquid boils, and can be thought of as the latent heat of "boiling" off adsorbed hydrogen. This is a large quantity of heat, and for many storage media, it will exceed typical cryogenic latent heats.

Figure 2A:
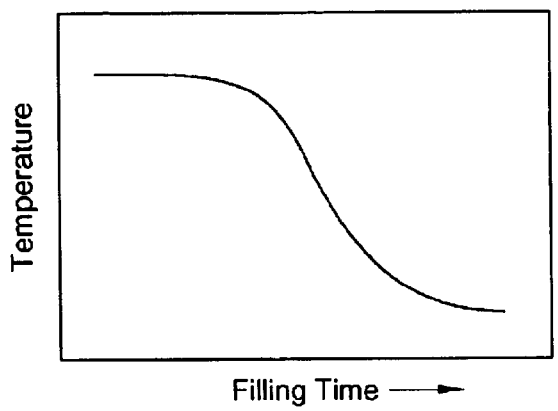
FIG. 2A. is a schematic representation of a filling chronology with respect to temperature. Temperature falls as a cryosorptive vessel is exposed to a flow of cold, pressurized hydrogen.
Figure 2B:
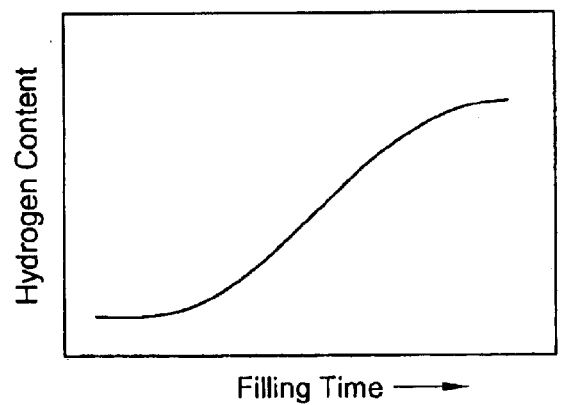
FIG. 2B. is a schematic representation of a filling chronology with respect to hydrogen content. Hydrogen content increases as a cryosorptive vessel is exposed to a flow of cold, pressurized hydrogen.
Figure 2C:
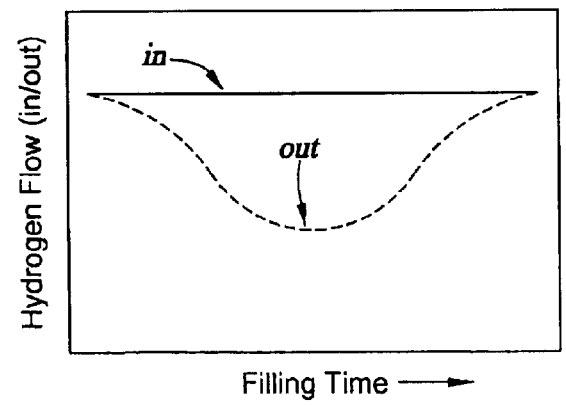
FIG. 2C. is a schematic representation of a filling chronology with respect to rates of hydrogen influx and efflux. As a cryosorptive vessel is exposed to a constant rate influx of cold, pressurized hydrogen, the efflux rate initially falls away from the influx rate, but then returns to a rate equivalent to it.

FIGS. 2 (A, B, and C) depicts a chronological course of conditions during the filling of a cryosorptive tank with cold hydrogen; FIG. 2A tracks temperature, FIG. 2B tracks hydrogen content, and FIG. 2C tracks hydrogen flow rates both into the tank and out of the tank. Over the course of filling of a hydrogen-empty tank, temperature falls (FIG. 2A) from the pre-fill initial temperature eventually to the temperature of the cold hydrogen entering the system. The time course of hydrogen content on the porous storage medium (FIG. 2B) mirrors the temperature course; initially the medium contains no hydrogen, but as temperature drops as a result of exposure to the influx of cold hydrogen, the host medium accumulates stored hydrogen until it reaches a saturation point at about the same time the temperature reaches that of the cold incoming hydrogen. The hydrogen content is depicted in terms relative to the maximum storage for the particular porous medium. The maximum storage in absolute terms (gm hydrogen/gm host medium, or hydrogen mass/volume) is a function of the specific material properties of the host porous medium.

The hydrogen flow rates in and out of a cryosorptive vessel are depicted in FIG. 2C. For the sake of simplicity the influx rate is shown as being constant, although in practice, hydrogen filling would not necessarily require a constant influx rate. Initially, the hydrogen efflux rate is equivalent to the influx rate, as the initial temperature of the cryosorptive storage medium is high enough to preclude hydrogen adsorption. However, as temperature drops within the medium, hydrogen adsorption is initiated, and the rate at which hydrogen is adsorbed is subtracted from the hydrogen flux through the vessel. Thus, the efflux rate falls for a period of time; and then as the host medium becomes hydrogen-saturated, the rate of adsorption falls, and the rate of hydrogen flux through the system eventually rises to equal the rate at which hydrogen is entering the vessel. At this point, clearly, the filling process is complete, and hydrogen influx is terminated.

Overview of the Hydrogen Storage and Supply System

An embodiment of this hydrogen storage and supply system, according to the invention, uses a cryosorptive hydrogen storage tank that receives hydrogen from the hydrogen economy's distribution chain; the hydrogen is generally channeled through an intermediary, or so-called first tank. The invention offers wide flexibility in terms of the form in which hydrogen arrives to the system, either as a liquid, gas, or chemical or metal hydride, as well as flexibility in terms of the storage vessels and means of conveyance by which the hydrogen arrives. Table 1 outlines the various embodiments and associated terminology which are useful in describing and understanding the nature of the invention, in the context of net flow of hydrogen from the distribution chain, through a first tank, and into the cryosorptive vessel.

TABLE 1

Filling a Cryosorptive Tank From the Hydrogen Distribution Chain: A Detailing of Analogous Components and Terms, According to Various Embodiments of the Invention Direction of Net Hydrogen Flow: Across the Three Columns, from Left to Right

| | | Hydrogen Storage and Supply System (Part 50) | |
|---|---|---|---|
| Hydrogen Location: basic terminology, and part numbers | Hydrogen source external to the inventive system: the Hydrogen Distribution Chain (Part 300) | Hydrogen Source Apparatus (Part 200) | Hydrogen Cryosorptive Storage Apparatus (Part 100) |
| Alternative terms, configurations, or relative location, according to various embodiments | Distribution via tank trucks, railroad tank cars, pipelines, etc. | First Tank Supply Source Tank Onsite Fuel Station Tank Common Platform | Second Tank Recipient Tank Vehicle or Machine Fuel Tank Common Platform |

TABLE 1-continued

Filling a Cryosorptive Tank From the Hydrogen Distribution Chain:
A Detailing of Analogous Components and Terms, According to Various
Embodiments of the Invention Direction of Net Hydrogen Flow:
Across the Three Columns, from Left to Right

| Hydrogen Form and Storage Configuration | Hydrogen in various forms and storage configurations | Hydrogen in various forms, including liquid, and varied storage tank configurations | Hydrogen, adsorbed on a porous medium, stored in a cryosorptive tank |
|---|---|---|---|

Figure 3:
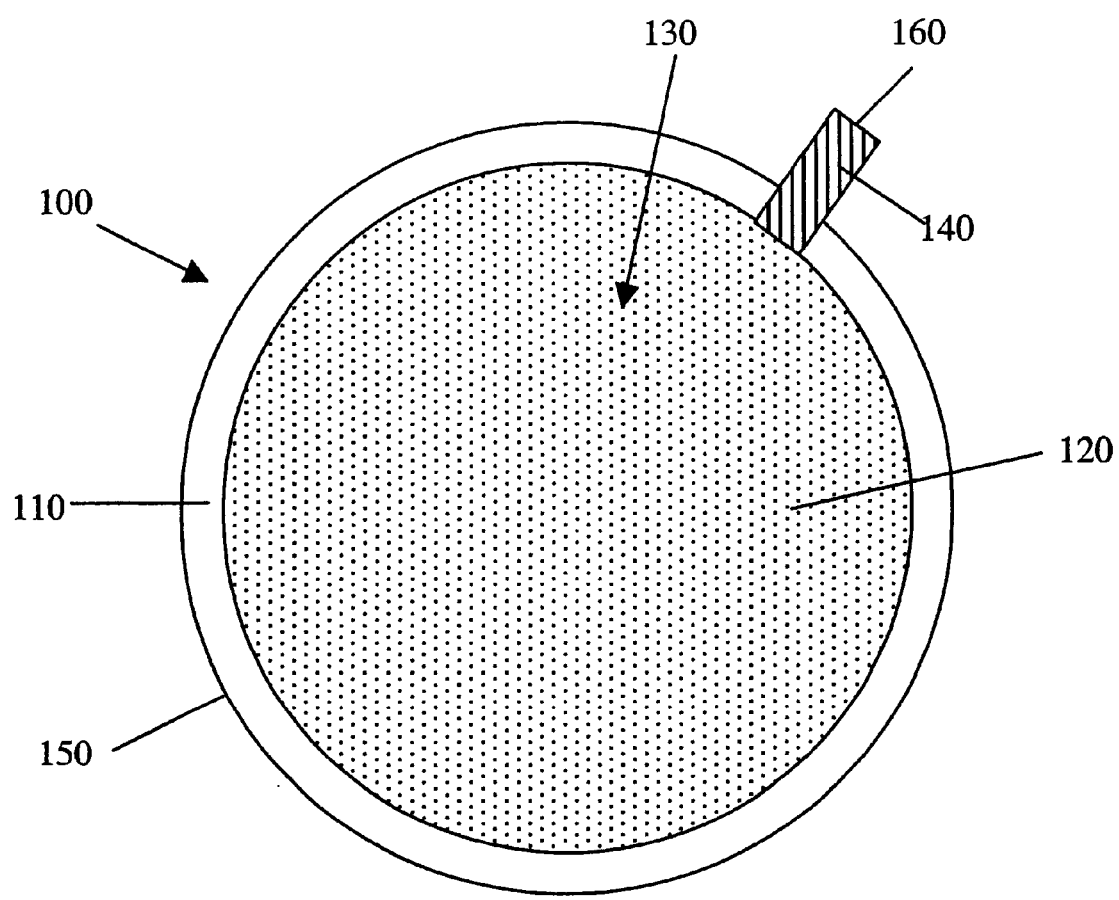
FIG. 3. is a schematic drawing of a cryosorptive hydrogen storage vessel, according to an embodiment of the invention.

FIG. 3 provides a simple schematic view of a cryosorptive storage apparatus 100, an embodiment of a vessel, amidst surrounding lines and connections centrally located within the inventive system. It contains an insulated pressure chamber with a cold enclosure 120, commonly known as a dewar; the dewar contains a porous hydrogen storage medium, and is fitted with all connections and equipment necessary to enable its operation. The operating pressure range of this vessel is far below the 350 bar to 700 bar range of high pressure vessels; it is typically about 10 to about 30 bar, but can include a larger pressure range of between about 1 bar and up to 50 bar or higher. The working volume required for this vessel depends on various interrelated metrics such as the hydrogen storage capacity of the medium (wt/wt %), the density of the medium (gm/L), and the absolute quantity of hydrogen stored (grams or moles/vessel).

As shown in FIG. 3, the cold enclosure 120 contains porous material, or host medium 130 with high surface area, that is capable of adsorbing or absorbing hydrogen. For the purposes of this disclosure, "porosity" is defined as the fractional percent of a material-occupied volume that is void, and by "porous material" is meant a material with a porosity greater than 50%. It is important for a host medium to be porous because pores provide access of gas to the medium, and because porosity, in general, is associated with high surface area. It is not the case for this invention, however, that very high porosity, such as a porosity of greater than 95%, is necessarily better. High porosity also brings with it a void volume burden, which ultimately compromises the hydrogen storage capacity as expressed in terms of hydrogen density per unit volume. High surface area porous material, for some embodiments, indicates a surface area greater than 900 $m^2$/gm. In general, material with a surface area in the range of 900 $m^2$/g to 4000 $m^2$/g is an appropriate range. In other applications; a range of 2000 $m^2$/g to 4000 m2/g may be appropriate, in still other application a range of 3000 $m^2$/g to 4000 $m^2$/g may be appropriate. The porous material 130 contains light elements from the second and third rows of the periodic table, including Li, Be, B, C, N, O, F, Na, Mg, Al, Si, P, S, and Cl and/or compounds thereof. Activated carbon is an example of such a material. A high surface area preparation of boron oxide is another example. The benefit derived from the use of light elements and compounds thereof is that the medium itself thus becomes light weight, or low density, and the amount of hydrogen adsorbed per unit weight of host medium thus becomes high.

The container 110 can have one port 140 as shown, or it can have more than one port 140. The one or more ports 140 provide channels for hydrogen flow into and out of the cold enclosure 120. The ports 140 can include valves (not shown) to control the hydrogen flow. For example, a first port 140 can be used to provide hydrogen to the cold enclosure 120, and a second port (not shown) can be used to withdraw hydrogen from the cold enclosure 120. Although FIG. 3 shows the distal end 160 of the port 140 extending beyond the exterior surface 150 of the container 110, this is only one possible arrangement. The distal end 160 of the port 140 can be flush with the exterior surface 150 of the container 110, or the distal end 160 can be recessed with respect to the exterior surface 150, as long as the arrangement provides a channel for hydrogen flow into or out of the cold enclosure 120. The distal end 160 of the port can engage with fittings on outside elements (not shown). Outside elements can provide hydrogen to the cold enclosure 120 or withdraw hydrogen from the cold enclosure 120 through the one or more ports 140.

Figure 4A:
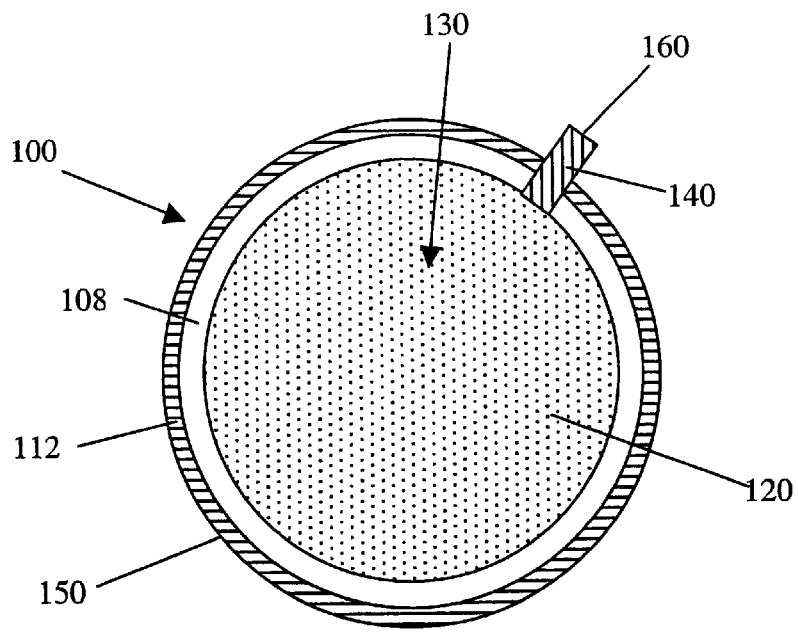
FIG. 4A. is a schematic drawing of a cryosorptive hydrogen storage vessel with a two wall structure, according to an embodiment of the invention.
Figure 4B:
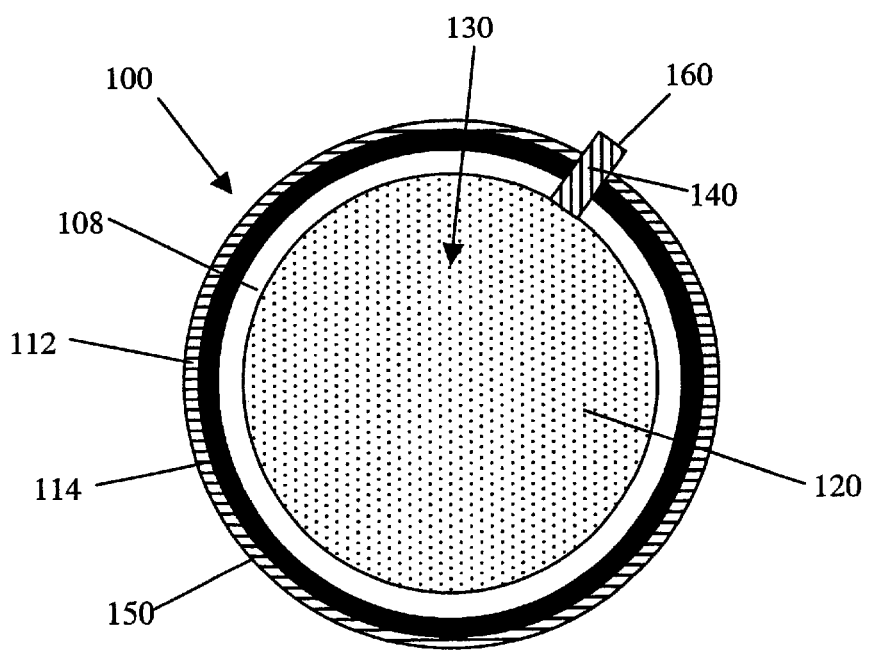
FIG. 4B. is a schematic drawing of a cryosorptive hydrogen storage vessel with a two wall structure and an intervening cavity.

FIGS. 4A and 4B show other embodiments of the invention, wherein the container for a hydrogen storage and supply apparatus has a multiple wall structure. In FIG. 4A, the cold enclosure 120 is surrounded by a first wall 108 that is surrounded by a second wall 112. In this arrangement, the first wall 108 and the second wall 112 are generally in contact with one another. In FIG. 4B, the cold enclosure 120 is surrounded by a first wall 108 that is surrounded by a second wall 112, and there is an intervening cavity 114 between the two walls. The cavity 114 can provide thermal insulation. The thermal insulation can be a in the form of a high quality vacuum, preferably the vacuum is below $10^{-5}$ torr, and more preferably, below $10^{-7}$ torr. The thermal insulation can be an insulating material (not shown), such as aerogel, disposed within the cavity or a thermal radiation reflecting material, such as multi-layer vacuum super insulation.

FIGS. 4A and 4B each show containers having two walls, but any number of walls can be used. The walls 108, 112, and others (not shown) can be made all of the same material, or different materials can be used for different walls. In one preferable arrangement, for example, the first wall 108 is a composite material, and the second wall 112 is aluminum. The containers illustrated in FIGS. 4A and 4B each have a port 140 as was shown for the illustrated embodiment in FIG. 3. As was discussed for FIG. 3, the containers can have one or more ports 140, which provide channels for hydrogen flow into and out of the cold enclosure 120. The ports 140 can include valves (not shown) to control the hydrogen flow. For example, a first port 140 can be used to provide hydrogen to the cold enclosure 120, and a second port 140' (not shown) can be used to withdraw hydrogen from the cold enclosure 120. The distal end 160 of the port 140 can be flush with the exterior surface 150 of the container, or the distal end 160 can be recessed with respect to the exterior surface 150, as long as the arrangement provides a channel for hydrogen flow into and out of the cold enclosure 120. The distal end 160 of the port can engage with fittings on outside elements (not shown). Outside elements can provide hydrogen to the cold enclosure 120 or withdraw hydrogen from the cold enclosure 120 through the one or more ports 140.

Flow of Hydrogen Within the System

Figure 5:
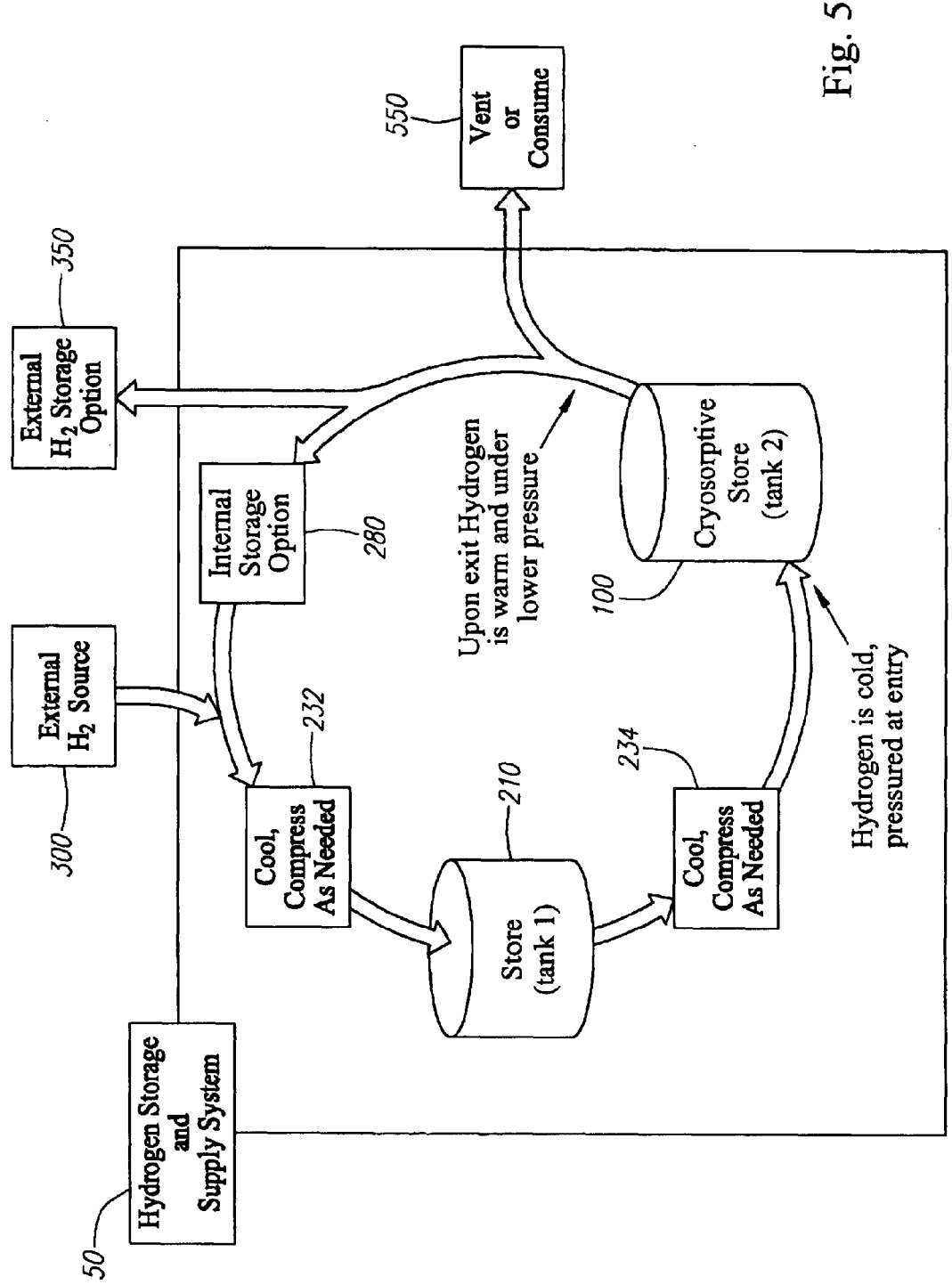
FIG. 5. is a schematic drawing of the flow of hydrogen from an external source, into a loop that circulates through the inventive hydrogen storage and supply system, exiting at various points.

FIG. 5 schematically depicts the flow of hydrogen through embodiments of the hydrogen distribution and storage system 50, in which hydrogen enters from an external source 300. Hydrogen entering the system 50 is cooled and/or compressed in step 232, as needed, prior to entry into a hydrogen source tank 210. Upon exit from the hydrogen source tank 210, hydrogen is cooled and/or compressed at step 234, as needed, prior to entry into a cryosorptive storage apparatus 100. In general, embodiments of the invention make use of either of the cooling and compressing steps 232 or 234; some embodiments of the invention make use of both steps, others make use of one or the other. Many factors and constraints, as for example will be related to specifics of the surrounding hydrogen economy infrastructure, will determine the most advantageous distribution of refrigeration and compression steps, either before or after storage in a hydrogen source tank 210. What the embodiments have in common, in spite of variability with regard to the distribution of refrigeration and compression process steps, is that hydrogen is cold and pressurized upon entry into the cryosorptive storage apparatus 100.

Upon exit from the cryosorptive storage apparatus, in most settings and applications, hydrogen is warmer and at a lower pressure than that at which it entered. Following its exit from the cryosorptive vessel, the warm hydrogen has three broad optional paths to follow. One path exits the inventive hydrogen storage and supply system 50, and is directed toward a venting into the environment, or toward a hydrogen consuming device 550. Examples of hydrogen-consuming or hydrogen-powered systems include any of those driven by a fuel cell or a hydrogen-fueled internal combustion engine, such as vehicles, industrial machines, household or commercial appliances, and/or electronic devices. The vehicles and other machines and devices are hydrogen-powered, but also include hybrid systems that operate on an additional form of power as well. A second path from the cryosorptive vessel also directs the warm hydrogen toward exiting the system, but conveys it toward an external hydrogen storage option 350, for ultimate export to an external hydrogen processing apparatus. A third path directs the warm hydrogen back toward the hydrogen source tank 210. Some embodiments of the invention provide for a warm hydrogen storage option 280 which holds the hydrogen within the system. With- or without the warm hydrogen storage 280, captured warm hydrogen within the system is cooled and compressed in step 232, thereby entering the same loop as that of hydrogen from an external source 300.

Figure 6:
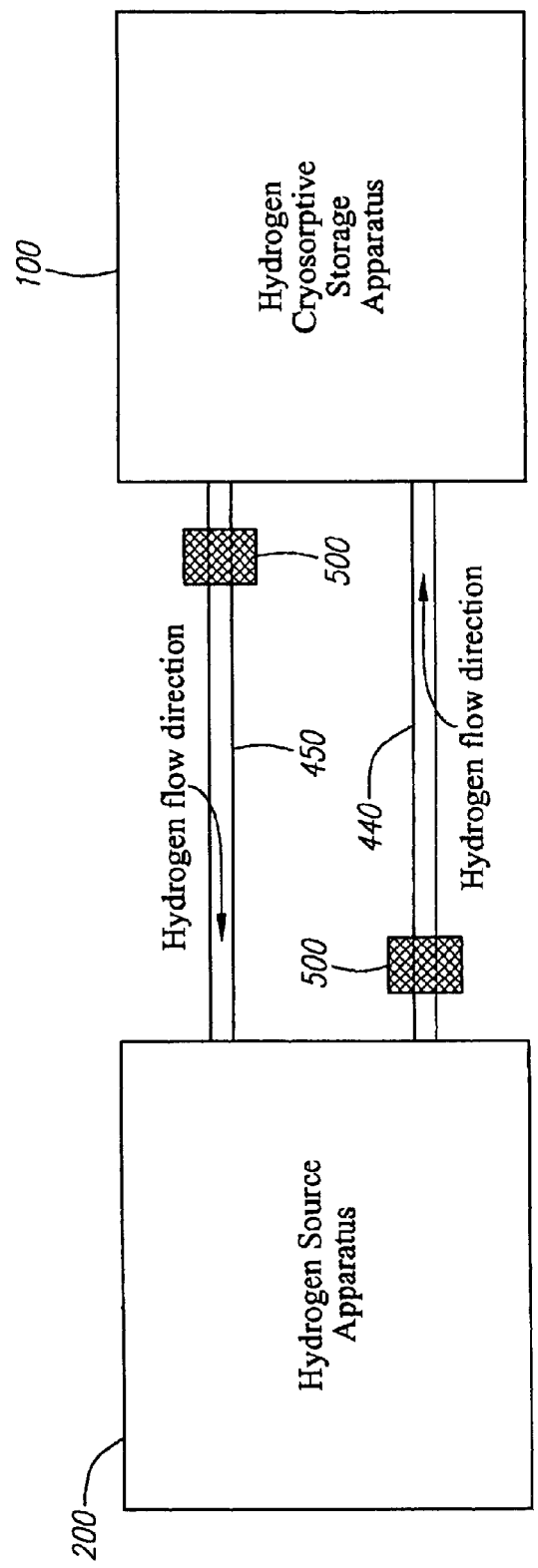
FIG. 6 is a schematic drawing showing a hydrogen source apparatus connected to cryosorptive hydrogen storage apparatus.

FIG. 6 focuses on some details of the hydrogen source apparatus 200, the hydrogen cryosorptive storage apparatus 100, and the flow of hydrogen between them. As depicted in FIG. 6 hydrogen flows within the inventive system from a hydrogen source apparatus 200, as for example, could be found in a stationary fuel station, into a hydrogen cryosorptive storage apparatus 100 as, for example, could be found as a tank onboard a vehicle. In other embodiments of the present invention, the source apparatus 200 and cryosorptive storage apparatus 100 could both be included or mounted on a common platform, either stationary or mobile. Hydrogen flows from the source apparatus 200 through line 440 into the cryosorptive storage apparatus; it flows in the opposite direction, from the cryosorptive storage apparatus 100 back to the source apparatus through line 450.

Figure 7:
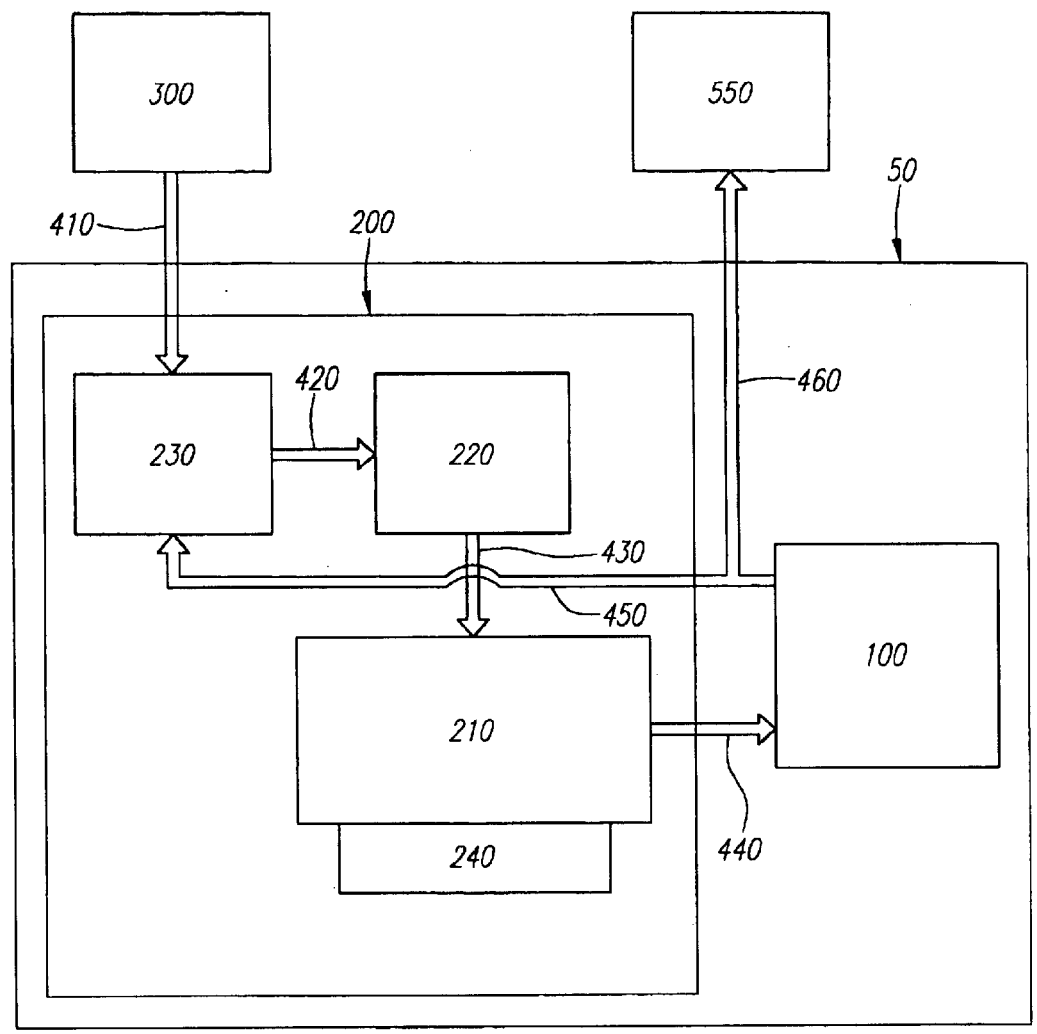
FIG. 7. is a schematic drawing of a hydrogen source apparatus and an interconnected cryosorptive hydrogen storage apparatus, with lines for conveying hydrogen within the source apparatus, and between the source apparatus and the cryosorptive storage apparatus.

FIG. 7 provides a more detailed schematic view of hydrogen flow within the system, as it depicts various components within the hydrogen source apparatus that are provided by embodiments of this invention. Hydrogen from an external source 300 enters the bounds of the inventive hydrogen storage and supply apparatus 50, and the hydrogen source apparatus 200, more specifically, through line 410. Within the hydrogen source apparatus, in this particular embodiment, hydrogen first enters a compressor unit 230, and exits the compressor through line 420 to enter a refrigeration unit 220. Hydrogen exits the refrigeration unit via line 430, and enters the hydrogen source tank 210. Some embodiments have a temperature control or refrigeration unit 240, which maintains the temperature of the source tank 210 at an appropriate level. From the source tank 210, hydrogen exits via line 440 and enters the cryosorptive storage apparatus 100. Hydrogen exits the cryosorptive apparatus and can exit the system via line 460, to be vented or utilized by a hydrogen consuming device 550. Exiting hydrogen can also be conveyed back to the hydrogen source apparatus via line 450, and enter the compressor unit 230. The embodiment depicted in FIG. 7 is but one example of an operable embodiment of the present invention. Many other various embodiments of the invention, differentiated by details of hydrogen flow and process step order are possible according to the principles outlined in this disclosure, and the options depicted in FIG. 5, and as generally understood by those practiced in these arts.

With regard to the case in which a hydrogen source tank is coupled to a recipient tank containing a cryosorptive medium on the same platform, either stationary or mobile, a coupled, closed, or closable system is created that includes both the hydrogen source apparatus and the cryosorptive hydrogen storage apparatus. In this case, hydrogen entering the recipient tank can be adsorbed by the cryosorptive medium and subsequently cycled back to be recaptured by the source tank, with cooling and compressing, as desired, within the coupled system.

Hydrogen flowing into the cryosorptive apparatus, in order to charge it with adsorbed hydrogen, is preferably cold and pressurized, as has been discussed above. If the immediate hydrogen source is liquid hydrogen, then the cold temperature requirement is already met by the liquid, which is then poured onto the medium under a pressure generally only slightly higher atmospheric pressure. If, on the other hand, the immediate hydrogen source is not cold, as is the case with hydrogen coming from a high pressure tank, from a solid metal hydride-containing storage tank, or from a large volume cryosorptive tank, embodiments of the invention, as detailed herein, provide for the cooling of the hydrogen prior to its entry into the cryosorptive storage tank. In general, hydrogen flowing back from the cryosorptive storage apparatus 100 to the hydrogen source apparatus 200 is warmer and under less pressure than the hydrogen which entered the cryosorptive apparatus.

Filling the Cryosorptive Storage System from Various Hydrogen Sources

Hydrogen entering a cryosorptive recipient apparatus 100 is preferably cold and under pressure. The specifics of the temperature and pressure ranges are determined by the properties of the cryosorptive medium. In the case of carbon, for example, for a pressure a range of about 10 to about 30 bar, it is useful for hydrogen to be in temperature range of about 40K to about 80K. In the case of boron oxide, for another example, for a pressure a range of about 10 to about 30 bar, it is useful for hydrogen to be in temperature range of about 100K to about 140K. The appropriate pressure ranges of entering hydrogen are determined by the operating specifications of the cryosorptive vessel, which is generally in range of about 1 to about 30 bar. The upper end of the range could extend, however, to include pressures of about 50 bar and above. Gaseous hydrogen entering the cryosorptive vessel generally exceeds the targeted final pressure of the vessel by several bar. In general, a factor limiting the filling rate involves the rate of the generated heat of adsorption on filling, while the pressure differential between entering hydrogen and the internal pressure of the recipient cryosorptive vessel is less significant. In other embodiments of the present invention, hydrogen is delivered to the cryosorptive vessel as a liquid, and pressure and temperature concerns associated with gaseous hydrogen are removed.

One of the organizing principles in the design and description of this invention is that of the relative position of storage and processing components within the overall flow of hydrogen, as organized above in Table 1. By external hydrogen source 300 is meant a connecting delivery link in a larger hydrogen distribution chain, such as a hydrogen tanker truck, or railroad tank car, or pipeline from a large storage depot. For the sake of providing a clear example, the source tank 210 as described in this disclosure can be exemplified as the onsite storage tank at a fuel station, and a recipient tank can be exemplified as the hydrogen fuel storage tank on a vehicle. Under some circumstances, it can be useful, when describing invention embodiments, to simply designate the source vessel in this example as a first tank, and the recipient vessel as a second tank. The onsite storage vessel at the fuel station, a source of hydrogen for the cryosorptive apparatus at the center of this invention is, itself, a hydrogen recipient when it receives a hydrogen load conveyed to it by a tank truck. Similarly, the recipient tank 100 is itself a source of hydrogen for the fuel cell. Further, it is not necessarily the case that the source vessel and the recipient vessel are on platforms easily defined as separate, such as (1) a stationary tank (onsite fuel station storage) and (2) a portable tank (vehicular fuel storage). In some embodiments of this invention, source and recipient vessels, or a first tank and a second tank, are contained within a single couple system, or on a common platform, configured to recapture hydrogen into the first tank after cycling through the second tank.

There are several broad classes of source hydrogen, at a fuel station for example, and embodiments of the present invention provide for apparatus and methods to provide cold, pressurized hydrogen from each source to the recipient cryosorptive vessel. The hydrogen source classes include at least (1) liquid hydrogen; (2) gaseous hydrogen; (3) a metal hydride; (5) a chemical hydride; and/or 5) hydrogen as a gas desorbed from a porous medium.

With regard to use of an onsite liquid hydrogen source apparatus, embodiments of the invention provide for the various alternative methods of filling from such a source. In one embodiment, liquid hydrogen is delivered by a truck, stored as a liquid in an onsite holding tank, generally underground, and hydrogen evaporates from the liquid to create cold gas under pressure. In a another embodiment, gaseous hydrogen is delivered in a truck, is liquefied onsite, held in a holding tank, and hydrogen evaporates therefrom to create cold gas under pressure. In still another embodiment, liquid hydrogen is delivered by truck, the liquid hydrogen is stored on site as a liquid, and delivered to the cryosorptive tank as a liquid.

With regard to use of a gaseous hydrogen source apparatus, embodiments of the invention provide for the various alternative methods of filling from such a source. Gaseous hydrogen is delivered to the fuel station under pressure, stored as gaseous hydrogen under pressure, and refrigerated during the pumping process. Alternatively hydrogen is delivered, refrigerated, stored as a cold gas, and then pumped into the cryosorptive vessel.

With regard to the delivery of hydrogen as a metal hydride, embodiments of the invention provide for various alternative methods of filling from such a source. Hydrogen is delivered as a metal hydride, stored in a holding tank as a metal hydride, and compressed and refrigerated, and then pumped into the cryosorptive vessel. Refrigeration and compression can be accomplished by conventional equipment and methods, or, as other embodiments of the invention provide, the thermodynamic properties of metal hydrides can be exploited to accomplish the compression and or refrigeration. Alternatively, metal hydrides can be delivered, stored in any other form, and delivered by methods as described herein appropriate for that storage form.

With regard to the delivery of hydrogen as a chemical hydride, embodiments of the invention provide for the various alternative methods of filling from such a source. Hydrogen is delivered as a chemical hydride, stored in a holding tank as a chemical hydride, and compressed and refrigerated in a pump which is directed toward the cryosorptive vessel. Alternatively, chemical hydrides can be delivered, stored in any other form, and delivered by methods as described herein appropriate for that storage form.

With regard to use of hydrogen desorbed from a source apparatus containing a porous medium, embodiments of the invention provide for the various alternative methods of filling from such a source. Hydrogen comes to be stored in the onsite fuel source in several possible ways, according to embodiments of the invention. In one embodiment, hydrogen is delivered to a filling station as a liquid, and poured into a porous medium storage tank onsite. In another embodiment, hydrogen is delivered to the fuel station in gaseous form, refrigerated, and conveyed onto the storage medium. In still another embodiment, hydrogen is delivered to the fuel station as hydrogen desorbed from a transported porous medium tank; in this case it is also refrigerated, and then conveyed to the onsite cryosorptive fuel storage tank. In all these embodiments hydrogen desorbed from the onsite cryosorptive fuel source tank is conveyed to the recipient cryosorptive storage vessel. If the porous storage medium in the source vessel is the same as that in the recipient vessel, then the hydrogen desorbed from the source vessel, being warm and under-pressured, is compressed and refrigerated, as provided by embodiments of this invention, prior to entry into the recipient vessel.

Refrigeration can play an important role in the delivery of hydrogen both to the hydrogen source apparatus for storage, and to recipient cryosorptive apparatus, according to several of the above-described embodiments. For example, in the embodiment in which the onsite source vessel itself is cryosorptive, refrigeration can be required in order to provide for efficient adsorption by the storage medium. Depending on the specifics of the application within embodiments of the invention and preferred efficiencies, various refrigeration cycles may be appropriate. Refrigeration efficiency is affected by both the number of compressors and heat exchangers used in the system; representative cycles include variations of the Brayton cycle and Claude cycle.

Purifying Entering Hydrogen and Adjusting the Ortho-Para Ratio

Figure 8:
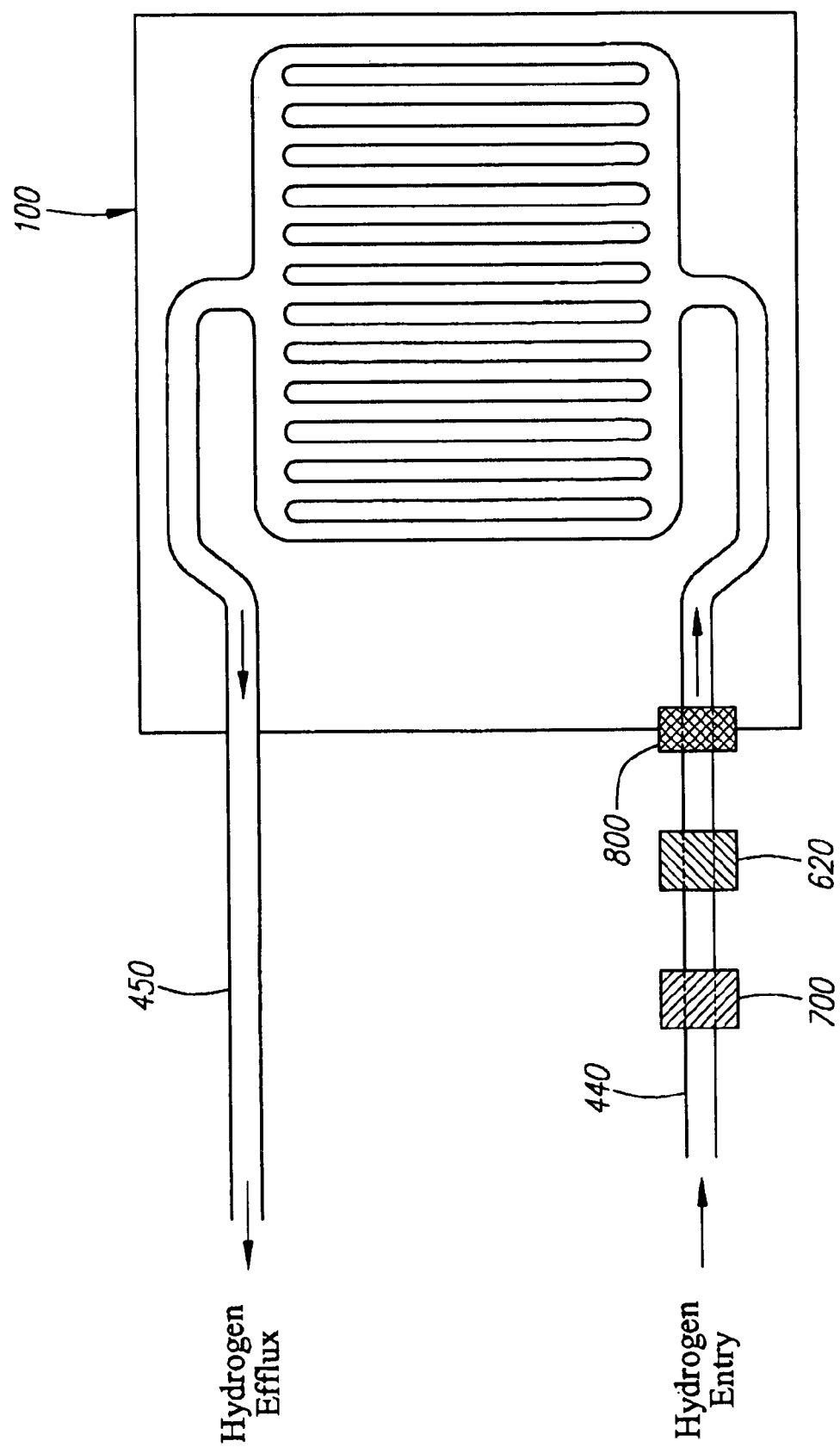
FIG. 8. is a schematic detail of the cryosorptive hydrogen storage apparatus, showing an ortho-para catalyst, a hydrogen purifying unit, an expansion nozzle, and a capillary-like circulatory pathway within the bulk of a cryosorptive medium.

FIG. 8 depicts details the location of several embodiments of the invention, including features that purify hydrogen entering the cryosorptive vessel, and adjust the ortho-para spin state ratio of hydrogen, which varies according to the temperature of hydrogen. One potential problem with regard to filling a cryosorptive vessel with hydrogen is that contaminating gases in the hydrogen supply can preferentially adsorb to the medium, and thereby significantly degrade the capacity of the medium to adsorb hydrogen. Accordingly, the present invention provides for an onboard hydrogen purifier. In one embodiment of the present invention, a palladium membrane (not shown) purifier is included in the hydrogen flow path on line 440. These devices are highly efficient, and can produce hydrogen with a purity of 99.9999999%; these devices are, however, expensive and fragile. In another embodiment of the present invention, the hydrogen is passed through a filter containing a packed column of activated carbon 620, located on line 440. Activated carbon adsorbs contaminants from the gas stream down to the parts per million level, which is a more than sufficient specification for this application.

Hydrogen gas has two different spin states, corresponding to two different orientations of the nuclear spin. The spin-aligned state, known as para-hydrogen, is lower in energy; the spin anti-aligned state, ortho-hydrogen, is higher in energy and has more states. At temperatures much higher than the energy difference, equilibrium distribution of hydrogen is 75% ortho and 25% para. At low temperatures, equilibrium hydrogen is all or substantially all in the para form. The proportion of hydrogen which is ortho at equilibrium declines from 75% at room temperature to 0% at 1 K, passing through 50% at around 80 K. This temperature-driven change in spin state releases energy as hydrogen is cooled (becoming para), and absorbs energy as hydrogen warms up (becoming ortho). The rate of the conversion process is remarkably slow; if the temperature of a batch of hydrogen is changed quickly, it can take on the order days for the ortho-para ratio to equilibrate.

Accordingly, an embodiment of the present invention includes a bed of ortho-para conversion catalyst, so that the hydrogen delivered to and from the storage medium has the ortho-para ratio appropriate for 80K. This feature allows the system as a whole to take advantage of the energy release that accompanies the ortho-para conversion. Various catalysts that accelerate the ortho-para conversion have been described, such as iron oxide nanoparticles. Several catalytic configurations are included; in one embodiment the catalyst is dispersed within the storage medium, in another (FIG. 8) the catalyst 700 is contained within the line 450 through which hydrogen passes. The presence of catalytic material ensures that the hydrogen is always at its temperature-associated equilibrium. The equilibrium state provides two significant benefits. The dormancy of filled tanks is increased, as the filled vessel does not have to absorb the heat of ortho-para conversion; and the amount of hydrogen needed to fill the tank is lessened, as the system takes full advantage of the heat capacity of gaseous hydrogen.

Cooling Hydrogen Prior to Entry into the Cryosorptive Tank, Heat Removal From the Cryosorptive Tank, and Rapid Hydrogen Movement within the Medium It is helpful to review the heat-related and cooling-related aspects of the process of hydrogen adsorption on a host medium, as has been described above. Hydrogen, preferably cold and pressurized, is supplied to the cryosorptive apparatus. As the medium reaches a sufficiently low temperature, hydrogen begins to adsorb on to the medium, thereby releasing the heat of adsorption into the interior of the storage vessel. In time, the medium reaches its final temperature and becomes fully charged with hydrogen. The sum of the newly released heat, meanwhile, has warmed a quantity of hydrogen gas, now under temperature-driven-increased pressure. To enable recapture of the warm hydrogen for use by the hydrogen storage and supply system, as provided by embodiments, the system removes such heat.

In some embodiments of the invention, cooling of entering hydrogen, if necessary, is provided by refrigeration, as described above. The invention, however, further provides another embodiment, as depicted in FIG. 8, that contributes to cooling in the form of an expansion nozzle 800. The nozzle provides for a point-of-use cooling capability, thus relieving at least some need for a cold temperature storage capacity. The expansion nozzle transforms the energy of the high pressure of an input hydrogen stream into a lowering the temperature of the gas stream. This nozzle is located at the point where incoming source hydrogen enters the cryosorptive system via line 440; one embodiment provides it attached to the distal end of line 440 from the fuel source apparatus, another embodiment provides for the nozzle to be configured at the entry port into the cryosorptive storage apparatus, and through which hydrogen is conveyed.

The invention has embodiments that provide for further refinements that enable efficient operation of the tank. To achieve efficient hydrogen penetration into the cryosorptive medium, and heat transfer for quick filling, for example, one embodiment of the system provides for tubes or channels that distribute the gas, and provide for movement of heat through the medium. In one embodiment, a highly pervasive distribution system comprises a few large tubes radiating distally from a central point to a plurality of smaller tubes on the peripheral aspect of the storage medium, in a manner similar to the bronchial system of the vertebrate lung. Another embodiment 135, shown in FIG. 8, is one in which a capillary-like system provides for efficient flow of gas and heat from the point of entry into the cryosorptive apparatus through the point of exit. In this configuration, gas enters the apparatus and is directed toward large channels that radiate into the bulk of the cryosorptive medium and branch into channels of increasingly smaller diameter. Once a minimum diameter is reached, the channels begin to coalesce into common exit channels of increasingly larger radius. As a whole, therefore, the capillary system contains large channels at the entry and exit into the bulk medium, and the large entry and exit channels provide a contiguous space connected by a plurality of smaller channels. Such a configuration provides for efficient flow of cold hydrogen into the adsorbing medium, and efficient efflux of a mixture of unadsorbed hydrogen and warm hydrogen generated during the adsorption process.

Recapture of Warm Hydrogen from the Cryosorptive Tank and Determining the Net Hydrogen Transfer During a Filling Operation The cryosorptive hydrogen storage vessel generates warm hydrogen by ways that include adsorption of the ambient heat within the unfilled vessel, from the heat generated by the heat of adsorption during the process of hydrogen adsorption on the host medium, and by heat leaked from the external environment. Warm hydrogen, pressure-driven to escape the cryosorptive apparatus, can be vented to the environment, as noted above, but is also available for recovery, as provided by embodiments of this invention. Methods of recovery of warm hydrogen broadly include (1) recovery within the hydrogen storage and system, or (2) by exporting to external systems. To briefly review the hydrogen recovery process that occurs within the bounds of the inventive system, embodiments provide that recovered hydrogen can be cycled back to the hydrogen source apparatus, through a cooler 220 and compressor 230, to be delivered to fuel station storage tanks 210 (refer to FIGS. 5 and 7). In this scheme, the energy output or penalty for recapturing hydrogen, and removing heat generated by the adsorption of hydrogen to the medium is operationally assumed by the fueling station.

From the perspective of the fuel station, or the hydrogen source apparatus, which services multiple vehicles, the returned gas penalty per net hydrogen fill will vary from car to car, depending on the starting temperature of the cryosorptive storage medium and other particulars of the vehicular fuel system. However, the cost of the penalty can be accounted for by measuring the quantity and temperature of warm hydrogen being conveyed back to the hydrogen source apparatus 200 during any particular filling episode. Flow measurement can occur, according to various embodiments at the point of exit from the cryosorptive storage apparatus, at the point of entry into the hydrogen source apparatus, or at any undivided point of flow between the cryosorptive apparatus and the source apparatus. While the hydrogen delivery efficiency penalty is operationally assumed by the fueling station, an embodiment of this invention provides for a business method whereby the penalty cost is factored in to the total cost to the customer for the fueling.

The invention provides for flow meters and thermometers within the hydrogen lines that convey hydrogen back and forth between the hydrogen source apparatus and the cryosorptive hydrogen storage apparatus, and such flow volume and temperature information is electronically captured within the hydrogen source apparatus. Cost calculations account for the net hydrogen flow and net heat from the hydrogen source apparatus to the cryosorptive hydrogen storage apparatus. A cost factor is assigned to the returned hydrogen according to the total heat returned to the source apparatus, a higher cost being associated with warm hydrogen as greater energy expenditure is required of the system in order to cool and compress it to the appropriate temperature to return it to the hydrogen source tank.

We claim:

1. A hydrogen storage and supply system comprising:
    a first hydrogen storage tank;
    a second hydrogen storage tank containing an inlet configured to receive hydrogen from the first tank;
    a porous medium in the second hydrogen storage tank, including at least one compound selected from the group consisting of Li, Be, B, C, N, O, F, Na, Mg, Al, Si, P, S, and Cl, wherein the medium includes at least one compound selected from the group consisting of boron oxide and its derivatives; and
    an outlet on the second hydrogen storage tank configured to release hydrogen.

2. A cryosorptive hydrogen storage and supply system comprising:
    a first hydrogen storage tank;
    a second hydrogen storage tank containing a porous medium, the tank configured to receive hydrogen from the first tank,
    at least one exit port from the second hydrogen storage tank;
    at least one line from the at least one exit port from the second hydrogen storage tank configured to convey hydrogen to a fuel cell; and
    at least one line from the at least one exit port from the second hydrogen storage tank configured to convey hydrogen back to the first hydrogen storage tank.

3. The system of claim 1, further comprising
    a delivery line configured to convey hydrogen from the first hydrogen storage tank to the second hydrogen storage tank; and
    a hydrogen ortho-para conversion catalyst situated within the line configured to convey hydrogen from the first hydrogen storage tank to the second hydrogen storage tank.

4. The system of claim 1, further comprising:
    a delivery line configured to convey hydrogen from the first hydrogen storage tank to the second hydrogen storage tank; and
    a hydrogen ortho-para conversion catalyst situated within the second hydrogen storage tank.

5. The system of claim 1, further comprising:
    a delivery line configured to convey hydrogen from the first hydrogen storage tank to the second storage tank; and
    a refrigerating unit and a compressing unit through which hydrogen from the first tank flows prior to entry into the second hydrogen storage tank.

6. The system of claim 1, further comprising a nozzle situated at the inlet on the second tank, the inlet configured to receive hydrogen from the first storage tank, wherein the hydrogen flows through the nozzle, the nozzle configured to disperse the hydrogen, thereby energetically converting the pressure of the hydrogen flow into cooling the hydrogen.

7. A method for filling a cryosorptive hydrogen storage system including the steps of:
    flowing cold, pressurized hydrogen from a hydrogen source apparatus;
    receiving the cold, pressurized hydrogen from the hydrogen source apparatus into a cryosorptive storage tank containing a porous medium;
    adsorbing at least some of the cold hydrogen onto the porous medium;
    returning overflow hydrogen from the cryosorptive tank back to the hydrogen source;
    cooling and compressing the hydrogen returned to the hydrogen source apparatus; and
    storing the cooled and compressed hydrogen in a hydrogen storage tank within the hydrogen source apparatus.

8. A method for filling a cryosorptive hydrogen storage system including the steps of:
    flowing cold, pressurized hydrogen from a hydrogen source apparatus;
    receiving the cold, pressurized hydrogen from the hydrogen source apparatus into a cryosorptive storage tank containing a porous medium;
    adsorbing at least some of the cold hydrogen onto the porous medium;
    returning a mixture of unabsorbed overflow hydrogen and warm hydrogen generated within the cryosorptive tank from the cryosorptive tank back to the hydrogen source apparatus;
    cooling and compressing the hydrogen returned to the hydrogen source apparatus; and
    storing the cooled and compressed hydrogen in a hydrogen storage tank within the hydrogen source apparatus, thereby making it available again for filling the cryosorptive storage tank.

9. A method for recapturing hydrogen from a cryosorptive hydrogen storage apparatus including the steps of:
    flowing cold, pressurized hydrogen from a hydrogen source apparatus into a hydrogen storage tank containing a porous medium;
    adsorbing at least some of the cold hydrogen onto the porous medium;
    conveying from the hydrogen storage tank a mixture of unadsorbed hydrogen and warm hydrogen generated within the hydrogen storage tank back to the hydrogen storage apparatus;

cooling and compressing the vented hydrogen returned to the hydrogen source apparatus; and storing the cooled and compressed hydrogen in a hydrogen storage tank within the hydrogen source apparatus.

10. A method for determining a cost of hydrogen fuel transferred from a hydrogen source apparatus to a recipient cryosorptive hydrogen storage apparatus including the steps of:

measuring a total amount of hydrogen conveyed from a hydrogen source apparatus to a cryosorptive hydrogen storage apparatus;

measuring a total amount of hydrogen returned from the cryosorptive hydrogen storage apparatus to the hydrogen source apparatus;

calculating therefrom a net amount of hydrogen transferred to the cryosorptive hydrogen storage apparatus;

determining differentials between the temperature and pressure of the hydrogen returned from the cryosorptive hydrogen storage to the temperature and pressure of the hydrogen storage vessel in the hydrogen storage apparatus;

assigning cost factors to the temperature and pressure differentials;

calculating a total hydrogen fuel cost based on the net amount of hydrogen transferred to the cryosorptive storage apparatus and the temperature differential and pressure differential cost factors.

* * * * *